Figure 1:
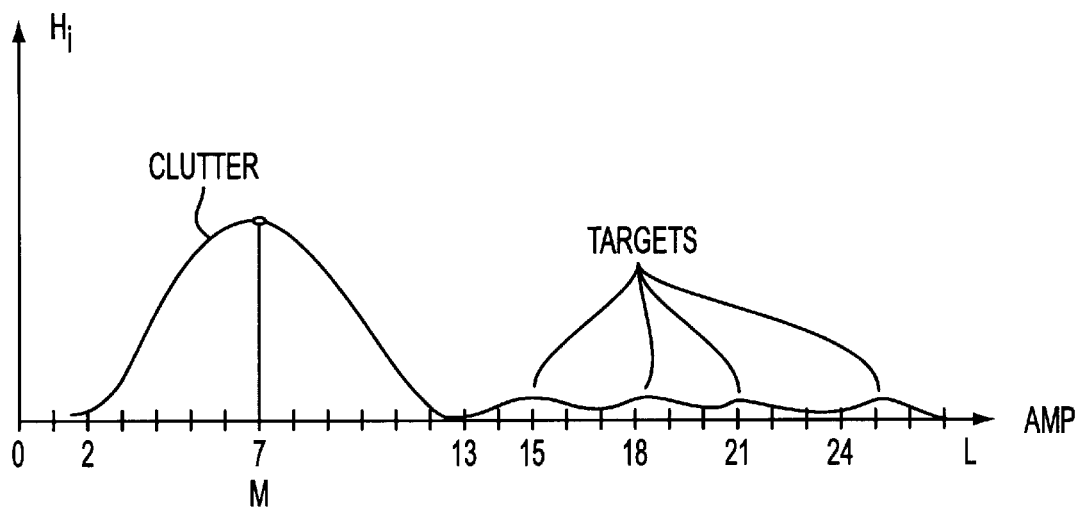

United States Patent

Hofele

[19]

[11] Patent Number: 6,040,797
[45] Date of Patent: Mar. 21, 2000

[54] METHOD FOR DETECTING A RADAR TARGET

[75] Inventor: Franz-Xaver Hofele, Donzdorf, Germany

[73] Assignee: DaimlerChrysler AG, Germany

[21] Appl. No.: 09/297,515

[22] PCT Filed: Sep. 1, 1998

[86] PCT No.: PCT/EP98/05535

§ 371 Date: Jul. 20, 1999

§ 102(e) Date: Jul. 20, 1999

[87] PCT Pub. No.: WO99/12051

PCT Pub. Date: Mar. 11, 1999

[30] Foreign Application Priority Data

Sep. 2, 1997 [DE] Germany .......................... 197 38 252

[51] Int. Cl.[7] .................................................. G01S 13/534
[52] U.S. Cl. .............................. 342/159; 162/91; 162/93; 162/115; 162/192
[58] Field of Search .................................... 342/159, 160, 342/161, 162, 91, 92, 93, 98, 104, 115, 116, 192, 195, 196

[56] References Cited

U.S. PATENT DOCUMENTS

| | | | |
|---|---|---|---|
| 3,797,016 | 3/1974 | Martin | 342/162 |
| 4,143,371 | 3/1979 | Salvadoun et al. | 342/159 |
| 4,586,043 | 4/1986 | Wolf | 342/93 |
| 5,504,487 | 4/1996 | Tucker | 342/196 |
| 5,563,604 | 10/1996 | Brandao et al. | 342/26 |
| 5,594,450 | 1/1997 | Schober | 342/97 |
| 5,612,700 | 3/1997 | Tucker | 342/196 |

FOREIGN PATENT DOCUMENTS

| | | |
|---|---|---|
| 0 107 588 | 5/1984 | European Pat. Off. . |
| 196 00 086 | 7/1997 | Germany . |

OTHER PUBLICATIONS

"Target detection in post–STAP undernulled clutter", Kreithen, D.E.; Steinhardt, A.O., Signals, Systems and Computers, 1995. Conference Record of the Twenty–Ninth Asilomar Conference on vol: 2, 1996, pp.: 1203–1207 vol. 2, 1996.

"Impact of experimentally measured Doppler spectrum of ground clutter on MTI and STAP", Billingsley, B.; Farina, A.; Gini, F.; Greco, M.V.; Lombardo, P., Radar 97 (Conf. Publ. No. 449), 1997, pp.: 290–294, 1997.

"A multiband GLRT–LQ algorithm for the coherent radar detection against compound–Gaussian clutter", Lombardo, P.; Pastina, D.; Bucciarelli, T., Radar 97 (Conf. Publ. No. 449), 1997, pp.: 576–580, 1997.

"Improvement factor for real sea–clutter Doppler frequency spectra", Farina, A.; Gini, F.; Greco, M.V.; Lee, P.H.Y., Radar, Sonar and Navigation, IEE Proceedings—vol.: 143 5, Oct. 1996, pp.: 341–344, 1996.

*Primary Examiner*—John B. Sotomayor
*Attorney, Agent, or Firm*—Venable; George H. Spencer; Robert Kinberg

[57] ABSTRACT

The invention relates to a method of detecting a radar target, especially a sea target, in the presence of clutter caused by ocean waves in particular. To detect a radar target within a predeterminable region, first a measurement window corresponding to this region is formed in the video range of the radar system, and a frequency distribution is determined for all pulse-height values (amplitudes) within the measurement window. The average value and the standard deviation can be determined from the distribution; from these values, a hit-recognition threshold is determined and used to decide whether a pulse-height value is to be associated with a radar target to be detected.

4 Claims, 1 Drawing Sheet

METHOD FOR DETECTING A RADAR TARGET

The invention is based on a method of detecting a radar target, as defined in the preamble to claim 1.

The term "radar target" as used in this patent application is a synonym (abbreviation) for the expression "a target that can be detected by means of a radar system." "Target" refers to an object that reflects radar waves and possesses at least one predeterminable characteristic, for example, it exceeds a predeterminable minimal radar backscatter cross section.

The invention can be applied particularly to the detection of sea targets, such as ships, that are surrounded by possible so-called (radar) clutter caused by, for example, ocean waves and/or environmental influences such as clouds and/or precipitation.

In the detection of sea targets in particular, it is known to divide a region to be monitored into cells (measurement windows) having a predeterminable area. Each cell contains a predeterminable number of so-called radar resolution cells. It is obvious to first select at least one measurement window that contains only (possibly time-dependent) clutter, and to determine a so-called clutter threshold value (in the video signal) for this cell (in the video signal of the radar system) that is based on, for example, the formation of a clutter average value within the window. If a predeterminable (amplitude) pulse exceeds the clutter threshold value in the video signal, this pulse is first considered a possible echo of a radar target (sea target), and may be supplied to a further evaluation, such as a classification and/or identification, if needed.

It is apparent that, in the detection of sea targets, the associated clutter threshold value is dependent on both time and location. This is because the motion of water waves can change over time, for example due to an impending storm. Furthermore, the wave motion and therefore the clutter can vary by location, at least from the viewing direction of a radar system; for example, they may assume different values in the close and far ranges. Such conditions interfere with and impede the detection of sea targets in particular.

It is the object of the invention to improve a generic method so as to permit a reliable determination of a clutter threshold value, especially in the detection of sea targets.

This object is accomplished by the features disclosed in the characterizing portion of claim 1. Advantageous embodiments and/or modifications ensue from the further claims.

A first advantage of the invention is that the determination of the clutter threshold in a wide range is independent of (radar) targets located within the (measurement) window selected for determining the clutter threshold value. It is advantageously not necessary to extract the target amplitudes (in the video range) present in this (measurement) window, which amplitudes are associated with the (radar) targets, for example by reducing the (measurement) window and increasing the number to be evaluated. In other words, it is advantageously not necessary to know where (radar) targets are located within the (measurement) window, because an extraction is only possible with such (difficult-to-obtain) knowledge. It is advantageously possible to reliably determine the clutter threshold value even if the component of the target amplitudes assumes a value of about 50% of all amplitudes to be evaluated in a selected (measurement) window.

A second advantage is that the method is virtually independent of the design of the radar system, particularly the target extractor used in the system. The extractor generally includes a digital data-processing system that preferably has a programmable microprocessor. If, for example, the method of the invention is to be employed in an existing radar system, it is advantageously only necessary to change the program (software) of the data-processing system. Thus, no assemblies (hardware) need to be changed, which is also advantageous.

Further advantages ensue from the following description.

Figure 2:
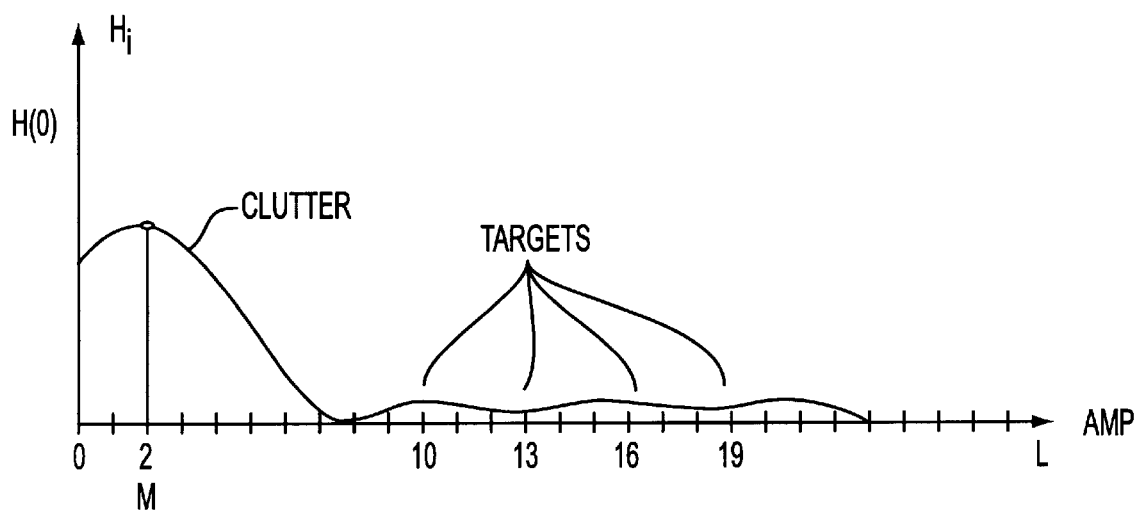

The invention is described in detail below by way of embodiments, with reference to schematic figures, which show in:

FIGS. 1 and 2 schematic diagrams for explaining the method.

The invention is based on the use of a radar-target extractor that is known per se, and is also referred to hereinafter as sea-target extractor. At this time, a sea-target extractor of this type usually includes a digital data-processing system. A sea-target extractor has the task of selecting the echo signals that are to be allocated to targets to be detected, for example ships, from a digitized video signal that corresponds to the received (radar) echo signals. In other words, it must distinguish between echo signals that originate from a (sea) target and those that are caused by clutter (swell) in particular.

The sea-target extraction performed in such a sea-target extractor essentially involves a step-wise reduction in the incoming data stream until, eventually, only data that are to be allocated to a sea target are outputted. Predeterminable threshold values with which the transmission of interfering data is prevented under predeterminable conditions are used to reduce the data stream.

To suppress clutter that is based particularly on the ocean swell (wave motion), it is advisable to use a clutter threshold value that is adapted to the swell and is based on a clutter model in which the clutter pulse heights are described by a (pulse height) frequency distribution. A frequency distribution of this type is completely characterized by the parameters of the average value M and the scatter S.

In sea-target extraction, it is useful to use a central threshold value, referred to as the hit-recognition threshold TEK, i.e., all echo pulses (in the video signal) that exceed the hit-recognition threshold TEK are considered to be associated with a sea target. The hit-recognition threshold TEK is linked with a false-alarm probability $P_{fa}$ corresponding to the formula $$P_{fa} = \int_{TEK}^{\infty} f(x)dx, \tag{1}$$

where f(x) represents the constant distribution density function of the present clutter distribution VT. If the swell, and therefore the associated clutter distribution, correspond to, for example, a Gaussian distribution with the average value $M=\mu$ and the standard deviation $S=\delta$ it is possible to determine the hit-recognition threshold TEK from this Gaussian distribution according to the formula $$TEK=\mu+\delta \cdot K(P_{fa}), \tag{2}$$

where K is a constant.

For example, with a predeterminable false-alarm probability $P_{fa}=10^{-2}$, the value $K(P_{fa}=10^{-2})=2.32$ results for the constant K.

The determination of the hit-recognition threshold TEK is explained below:

If, for example, a sea region located at a predeterminable range and having a predeterminable area is scanned by a radar system, the region can be represented as a measurement window on a display screen. The measurement window contains pulse-height values (echo signals) that correspond to clutter and target amplitudes (in the video range).

If it is assumed, in an ideal case, that only clutter amplitudes (i.e., only clutter-based amplitudes) are present, the average value M and the standard deviation S are determined from the associated (clutter) pulse-height values. From this, the hit-probability threshold TEK is determined corresponding to the formula $$TEK = \text{Function}(M, S, P_{fa}) \qquad (3)$$

If the present distribution of the (clutter) pulse-height values is Gaussian, Formula (3) gives way to Formula (2), and the TEK can be determined in the described manner.

In real cases, however, interferences are present, for example due to a deformation of the clutter distribution, that is, the distribution is asymmetrical with respect to the average value M, and/or unknown (target) pulse-height values (originating from targets to be detected) are present in the measurement window.

In the method of the invention, all pulse-height values lying within a predeterminable measurement window are evaluated, that is, pulse-height values that correspond to clutter and those that are associated with targets to be detected. For all pulse-height values present in quantized (digitized) form inside the measurement window, the frequency of the pulse heights is now determined, meaning that the associated distribution-density function VDF is determined. From this, predeterminable criteria, which will be described below, are determined, and from these, the average value M and the standard deviation S are determined. These are used to determine the hit-recognition threshold TEK corresponding to Formula (3).

These criteria are based on, for example, empirical experiment values, where, for example, a known deformation ("shortening") of the present pulse-height distribution of all pulse-height values within the current measurement window is considered;

the present bit number of the analog-digital converter used for generating the present pulse-height values is taken into consideration; the selected bit number determines whether the pulse-height values are determined with a fine or coarse gradation.

The determination of the average value M and the standard deviation S with consideration of the aforementioned, exemplary criteria is described in detail below in conjunction with the schematic figures.

It is assumed hereinafter that the echo signals (clutter and/or target echoes) that a radar system receives from a predeterminable measurement window are down-converted into the video range in a manner known per se, resulting in an amplitude-modulated, analog video signal. If needed, this signal can subsequently be filtered in analog fashion, for example by means of a threshold circuit, particularly a CFAR circuit embodied as a digital component, so that, for example, predeterminable noise components are removed from the analog video signal. An analog/digital converter now converts this low-noise, analog video signal into an associated, digitized video signal. The analog/digital converter uses an analog amplitude value to generate an associated, digital, quantized amplitude value AMP (abscissas in FIGS. 1 and 2). The maximum number L of possible amplitude values is dependent on the bit number of the used analog/digital converter, corresponding to the formula $L = 2^{bit\ number} - 1$.

FIG. 1 shows the frequency $H_i$ (ordinate), where $i = 0, 1, 2, \ldots, L$, of the distribution-density function VDF (solid line in FIG. 1) for a current, predeterminable measurement window and the quantized amplitude values AMP therein, which can be caused by clutter and targets to be detected, as a function of the possible quantized amplitude values AMP (abscissa), which are determined by the bit number of the analog/digital converter. It can be seen from FIG. 1 that present targets having an amplitude value greater than 13, for example, are not readily recognizable, in other words, in the form of "peaks" in the frequency distribution, but are distributed over a plurality of amplitude values, that is, a "blurred" representation is present in the amplitude distribution. At this time, commercially-available analog/digital converters that can be used for these applications, and have bit numbers of, for example, 4, 8, 16 or 32, can be obtained inexpensively. In FIG. 1, purely for the sake of a graphic depiction, it is assumed that a threshold value of zero is present in the aforementioned threshold circuit, and that the clutter-based, quantized amplitude values possess a Gaussian distribution whose average (amplitude) value M lies at the quantized amplitude value 7. The quantized amplitude values associated with targets to be detected lie at quantized amplitude values that are greater than 13. Clearly, a very crude quantization is present for the amplitude values.

It can be seen from FIG. 1 that no amplitude values are associated with clutter, but, around the average value M, they possess significantly higher frequencies $H_i$ than the targets to be detected.

The following method steps are performed in the method:

1. For all echo signals (clutter and targets) present in the measurement window, the frequencies $H_i$ associated with a respective, quantized amplitude value are determined at the associated, digitized amplitude values, resulting in a distribution-density function. In the process, the frequencies $H_i$ are given in percentage values, for example, with the sum of all frequencies $H_i$ within the measurement window equaling 100%. For the average value M, with the assumption of a Gaussian-distributed clutter of the quantized amplitude values, the formula $$0.5 = \frac{\int_{i=0}^{M} H_i}{\int_{i=0}^{L} H_i} \qquad (4)$$

applies, where $i = 0, 1, 2, \ldots L$ and $L = 2^{bit\ number} - 1$. The following formula applies for the standard deviation S, with the assumption of a Gaussian-distributed clutter:

$$0.841345 = \frac{\sum_{i=0}^{M+S} H_i}{\sum_{i=0}^{L} H_i}. \qquad (5)$$

This means that the average value M lies at the quantized amplitude value at which the distribution function (VF) of the quantized amplitude values assumes the value of 0.5.

The amplitude value M+S then lies at the quantized amplitude value at which the distribution function (VF) of the quantized amplitude values assumes the value of 0.841345.

The given 50% mark (for the average value M) and the 84% mark (for the standard deviation) are only applicable for a Gaussian distribution of the clutter. If, however, as dictated by the selection of the signal processing of the clutter, a distribution other than the Gaussian distribution is present, the "50% mark" and the "84% mark" must be adapted to this distribution. In theory, this is possible for any distribution.

2. Formulas (4) and (5) yield the following instruction for the application:

Starting from the smallest quantized amplitude value $H_0$ (i=0), the frequencies $H_i$ of the present distribution-density function VDF are added until 50% of the quantized amplitude values present in the measurement window have been detected. The quantized amplitude value im associated with the average value M lies at this location.

The frequencies $H_i$ are then added until 84.1345% of the quantized amplitude values present in the measurement window have been detected. The quantized amplitude value $i_{M+S}$ associated with the value M+S lies at this location.

The standard deviation S can then be determined from the formula $$S = i_{M+S} - i_M \qquad (6)$$

3. The hit-recognition threshold TEK is correspondingly ascertained with the average value M determined in this manner and the subsequently-determined standard deviation S, according to Formula (3).

Formulas (4) and (5) apply for a model in which a Gaussian distribution of the clutter is assumed. If, in contrast, the clutter is not Gaussian-distributed, but is associated with (corresponds to) a different distribution, Formulas (2), (4) and (5) must be adapted to this distribution.

The described method of determining the average value M and the standard deviation S has considerable advantages over other M/S estimation methods in use:

a) The described pulse-height analysis is not limited to a Gaussian clutter distribution, but can be applied to virtually any others, for example to a clutter distribution possessing a plurality of (relative) maxima of the quantized amplitude values, the values being virtually identical in height. In such a case, it is only necessary to adapt the criteria corresponding to Formulas (4) and (5) to the present distribution, for example by means of empirically-determined weighting factors. If the distribution is not Gaussian, the determination of the hit-recognition threshold TEK must be modified by a corresponding, different formula from Formula (2). This is represented generally by the term "Function(M, S, $P_{fa}$)" in Formula (3).

b) The method permits a technically simple, precise and fast determination of the average value M and the standard deviation S, because only mathematically-simple calculation operations need be performed.

c) Advantageously, no target amplitudes are factored into the estimation of the average value M and the standard deviation S, because target amplitudes are large, i.e., greater than M+S, which is greater than M, and because the addition of the frequencies $H_i$ begins at the smallest quantized amplitude value ($H_0$).

d) For a precise estimation of the average value M and the standard deviation S, it is advantageously unnecessary for a complete distribution-density function VDF to be present for clutter; rather, corresponding to FIG. 2, a distribution that is "shortened" downward can also be present. This type of distribution occurs, for example, when the noise and/or CFAR thresholds mentioned at the outset are so high that they can also be used to suppress clutter components.

It is apparent that, for the described method, it is only necessary that at least half of the distribution function be available. In such a "shortened" distribution-density function VDF, a frequency $H_0$ of non-interfering height, e.g. $H_0$=30%, is associated with the smallest quantized amplitude value. Starting from this high frequency $H_0$, the addition is continued in the method until the values given in Formulas (4) and (5) are attained. In an extreme case, even the value of $i_M$=0 is permissible.

e) Advantageously, no additional conversion, for example by means of tables, is necessary for converting the measured values for the average value M and the standard deviation into the associated, correct theoretical values, particularly in a "shortened" distribution-density function.

An obvious advantage of the described method is that, nearly each time, only the clutter distribution is detected, because it is known, for example from empirical measurements, that the target pulse-height values associated with possible targets occur with a significantly lower frequency, but with considerably higher quantized amplitude values, than the clutter pulse-height values—see FIGS. 1 and 2.

Clutter amplitudes appear at smaller amplitude values in the frequency distribution. In contrast, target amplitudes generally appear at considerably larger amplitude values.

If, in applications, it is now possible that more than approximately 8% of the amplitudes located in a measurement window are to be assessed as target amplitudes, for example, in the unfavorable combination of a small measurement window and remote scanning, the skewing of the measurement of the values M and S by the real target amplitudes is avoided. This is effected in that, in this case, the "100% mark" in Formulas (4) and (5) is not defined by the addition up to the value L, that is, $$\sum_{i=0}^{L} H_i,$$

but rather by the fact that the "100% mark" is established by a summation up to a value P, with P<L, for example P=L/2. The establishment of the mark is based on the fact that the probability that clutter amplitudes larger than or equal to L/2 will occur is negligible, particularly in the case of a "shortened" distribution.

It is apparent that, in the method, it is advantageously not necessary to determine at which locations within the measurement window targets are located, and at which locations only clutter is present. This means that it is not necessary to divide the measurement window into smaller sub-windows that would otherwise be required for recognizing targets.

The invention is not limited to the described embodiments, but can be analogously applied to others. Thus, it is possible to use the method to detect general radar targets that are surrounded by so-called fixed-target and/or moving-target clutter.

I claim:

1. A method of detecting a radar target in the presence of clutter, in which the echo signals received by a radar system, which include both radar targets and clutter, are converted into the video range such that digitized pulse-height values are present, which correspond to the echo signals and correspond to the amplitudes of the echo signals in the video range;

the digitized pulse-height values are evaluated by means of a radar-target extractor;

a measurement window of a predeterminable size is formed in the radar-target extractor, the window corresponding to a predeterminable monitoring region having a predeterminable area;

a threshold value corresponding to the clutter is determined for the measurement window from the pulse-height values present there; and the pulse-height values present in the measurement window are compared to the threshold value, and an echo of a radar target is recognized when a pulse-height value exceeds the threshold value, characterized in that a frequency distribution is determined for all pulse-height values within the measurement window;

starting from the smallest present pulse-height value, having the associated frequency ($H_0$), the pulse-height values are added until a first predeterminable component of all of the pulse-height values present in the measurement window, the component amounting to 50% in a Gaussian distribution, is detected;

the pulse-height value ($i_M$) associated with this predeterminable first component is determined and established as the average value (M) of all pulse-height values within the measurement window;

the addition of the pulse-height values continues until a second predeterminable component of all of the pulse-height values present in the measurement window, the component amounting to 84% in a Gaussian distribution, is detected;

the pulse-height value ($i_{M+S}$) associated with this predeterminable second component is determined;

the standard deviation (S) is determined from the difference between the pulse-height value ($i_{M+S}$) associated with the second component and the pulse-height value ($i_M$) associated with the first component, according to the formula $S = i_{M+S} - i_M$;

a hit-recognition threshold TEK is determined according to the formula TEK=Function(M, S, $P_{fa}$), where Function=a predeterminable function;

M=the average value of the pulse-height values;

S=the standard deviation; and $P_{fa}$=a predeterminable false-alarm probability; and within the measurement window, each pulse-height value is compared to the hit-recognition threshold TEK such that a pulse-height value larger than the hit-recognition threshold TEK is assessed as being associated with a radar target.

2. The method of detecting a radar target according to claim 1, characterized in that, in the presence of a frequency distribution that deviates from a Gaussian distribution, the average value and the standard deviation are derived in a predeterminable manner, depending on the type of frequency distribution.

3. The method of detecting a radar target according to claim 1, characterized in that, in a non-Gaussian frequency distribution, the formation of the hit-recognition threshold TEK is selected in a predeterminable manner, depending on the present frequency distribution.

4. The method of detecting a radar target according to claim 1, for use in the detection of a sea target, with the clutter essentially being caused by the motion of the waves.

* * * * *